MAGNETIC PIN MEMORY SYSTEM

Filed Oct. 23, 1962 5 Sheets-Sheet 1

Inventors
David W. Beecher
Gordon L. Morgret
By: Albert M. Zalkind
ATTORNEY

Dec. 30, 1969 D. W. BEECHER ET AL 3,487,387

MAGNETIC PIN MEMORY SYSTEM

Filed Oct. 23, 1962 5 Sheets-Sheet 5

United States Patent Office 3,487,387

Patented Dec. 30, 1969

3,487,387

MAGNETIC PIN MEMORY SYSTEM

David W. Beecher, Rockville, and Gordon L. Morgret, Middletown, Md., assignors to Aerojet-General Corporation, Azusa, Calif., a corporation of Ohio

Filed Oct. 23, 1962, Ser. No. 232,381

Int. Cl. G11b *5/00*

U.S. Cl. 340—174.1 18 Claims

ABSTRACT OF THE DISCLOSURE

A conveyor sort control system utilizing a conveyor belt which moves past a series of diverter stations is controlled by the invention herein for the purpose of diverting parcels at selected stations along the length of the belt. The invention utilizes an operator programmed arrangement having a memory unit which consists of a rotary drum carrying a plurality of magnetizable pins arranged in longitudinal and radial set in which longitudinal rows of pins corresponding in number to the number of articles being coded and carried on the belt at one time, and wherein the number of pins in each such row or column corresponds to the number of stations at which articles can be diverted. Means are provided for magnetizing the pins in accordance with programmed operation and selectively magnetized pins operate magnetic switches to effect actuation of diverter mechanisms at selected stations spaced along the conveyor belt.

This invention relates to conveyor systems wherein a continually moving belt is combined with diverter elements such as paddles, or the like, for pushing articles off the belt at selective points along the length of the belt. In particular, the invention relates to a control system utilizing a magnetic memory unit in which is stored coded signals relating to specific diverters for the purpose of actuating a particular diverter at a point where a particular article, is to be removed from the belt. Such points are referred to herein as "stations."

In general, sorting systems of the kind described above have now become fairly well developed, and are in use in warehouses, post offices, and the like. For example, where used in a post office, a long continuously moving belt, possibly several hundred feet long, would be utilized and various stations along the length of such belt would be provided with chutes generally transverse to the belt, or powered conveyors, and at each such station a diverter for pushing packages or mail bags from the belt into the respective chute is provided. Systems of the kind described may have a chute on each side of the belt at any particular location, in which case a reversible motor-operated diverter may act in either direction to push an article off either side of the belt. Thus, the invention contemplates control of one-way and two-way diverters, depending on whether they act in one direction, or reversibly, in two directions.

The various stations at which are located the transverse chutes and respective diverters may correspond to states or cities to which the articles diverted thereat are to be forwarded.

To control the diverters in conventional systems so that they will perform their function when particular packages arrive at selected stations, a program arrangement is generally used which is operator controlled. Such program arrangement employs a push button keyboard, a memory unit, and suitable circuitry such that an operator at one end of the belt placing an article thereon, pushes a button for a respective station diverter at about the time that he places an article on the belt. The memory unit which in prior devices usually is a magnetic or punched tape or the like receives signals which it records in accordance with the button selected by the operators for a particular destination of article and as the article moves on the belt, the tape moves at an analogue speed. When the article has reached the station at which it is to be diverted off the belt onto a transverse chute or other conveyor, a pick-off means senses the signal on the belt and through appropriate control circuitry actuates motor to effect functioning of the diverter. Such a system is, for example, shown in Atanasoff Patent No. 3,033,366.

The present invention pertains to improvements to the memory element and related components and it is believed that the invention is of general application, although particularly directed to post office sorting systems of the kind described It is an object of the present invention to provide a versatile memory unit and control system of simple, economical and rugged construction on which signals may be "written in" magnetically. It is another object of the invention to provide a memory unit wherein switches are controlled by magnetized pins, and wherein a minimum of coercive force is needed for magnetizing.

It is a further object of the invention to provide a system wherein magnetically operated switches may be either attracted or repelled by magnetized pins moving in proximity thereto, and wherein the demagnetizing flux effect of the proximity of such drum pins on the magnetic switches is kept to the a minimum.

It is still further object of the invention to provide a memory unit utilizing closeable contact switches wherein closure of the contacts passes no current until contact pressure has reached a maximum amount.

An even further object of the invention is to provide a system capable of controlling a large number of one-way and two-way diverters in any sequence.

Other objects and features will be apparent from the description to follow:

Briefly, the invention contemplates the use of a magnetic memory of novel construction and of novel coaction with a set of switches connected in series which control the various diverters in coded combination. Thus, the memory unit itself consists of a drum of iron which may be rotatively mounted on a vertical axis and which has magnetic code pins extending radially therefrom in longitudinal, i.e., vertical columns or sets. Juxtaposed around the drum in vertical columns are magnetically operable switches each of which has a flexible center leaf carrying a magnet, e.g., a magnetic pin, which can be attracted or repelled by the code pins as the drum rotates. Magnetization of the code pins in one flux direction is accomplished by a set of stationary write-in solenoids arranged in a longitudinal column close to the drum and erasure of the code pins is by reverse polarization effected by a column of solenoids upstream of the write-in solenoids. The arrangement is such that a relatively easily magnetized material, such as Alnico V is used for the code pins, while the switch pins are made of Alnico VII in order to remain permanent magnets without polarity reversal, since Alnico VII has a high coercive force. Thus, the code pins may be polarized readily in either direction, while the switch pins remain permanently polarized in a single direction. The erasing function of the erase solenoids is actually to reverse the magnetic polarity of the code magnets rather than to remove the flux.

If the switch magnets are always polarized in one direction, they can be attracted by opposite poles of the code magnets, but will be repelled by like poles when the code magnets are so polarized. Accordingly, although the switches make contact when attracted, they also make contact when repelled. Thus, reversible diverter actuation can be achieved wherein the switches are of a double throw type to control two-way diverters. By providing for reverse polarization of the code magnets where one-way diverters are controlled, that is, when the code magnets are "erased," there is no danger of attraction or closing of a switch accidentally whereby a diverter might be actuated at the wrong time, since in the erased condition the magnets repel. This repulsion effect of the "erased" code pins is used for effecting contact of the magnetic switches in a direction opposite to the direction of attraction; thus, bi-directional movement of the center contact of a SPDT switch controls direction in which articles are pushed off the belt by a two-way diverter, left or right.

A further very important feature of the memory unit is an arrangement whereby polarization of the code magnets is effected by way of a complete magnetic path of which the code magnet or pin is part. Thus, a small solenoid with low current may effect such magnetization or polarization. On the other hand, as the code pins approach the switch magnets, they merely attract (or repel), but there is no closed magnetic path for the flux to follow, therefore, the demagnetizing effect of the code magnets on the switch magnets is minimized.

A further particular feature of the invention is the use of a plurality of cam switches through which diverter control current must pass via the magnetic switches wherein the cam switches rotate in synchronization with the drum and close at such time as a column of code pins is in radial register with a column of magnetic switches. Accordingly, the contacts of the magnetic switches will carry current only in the radially aligned position when the contact pressure, due to attraction or repulsion of aligned code pins, is greatest.

A detailed description now follows, in conjunction with the appended drawing, in which.

THE MEMORY UNIT

Figures 1, 2, 3:
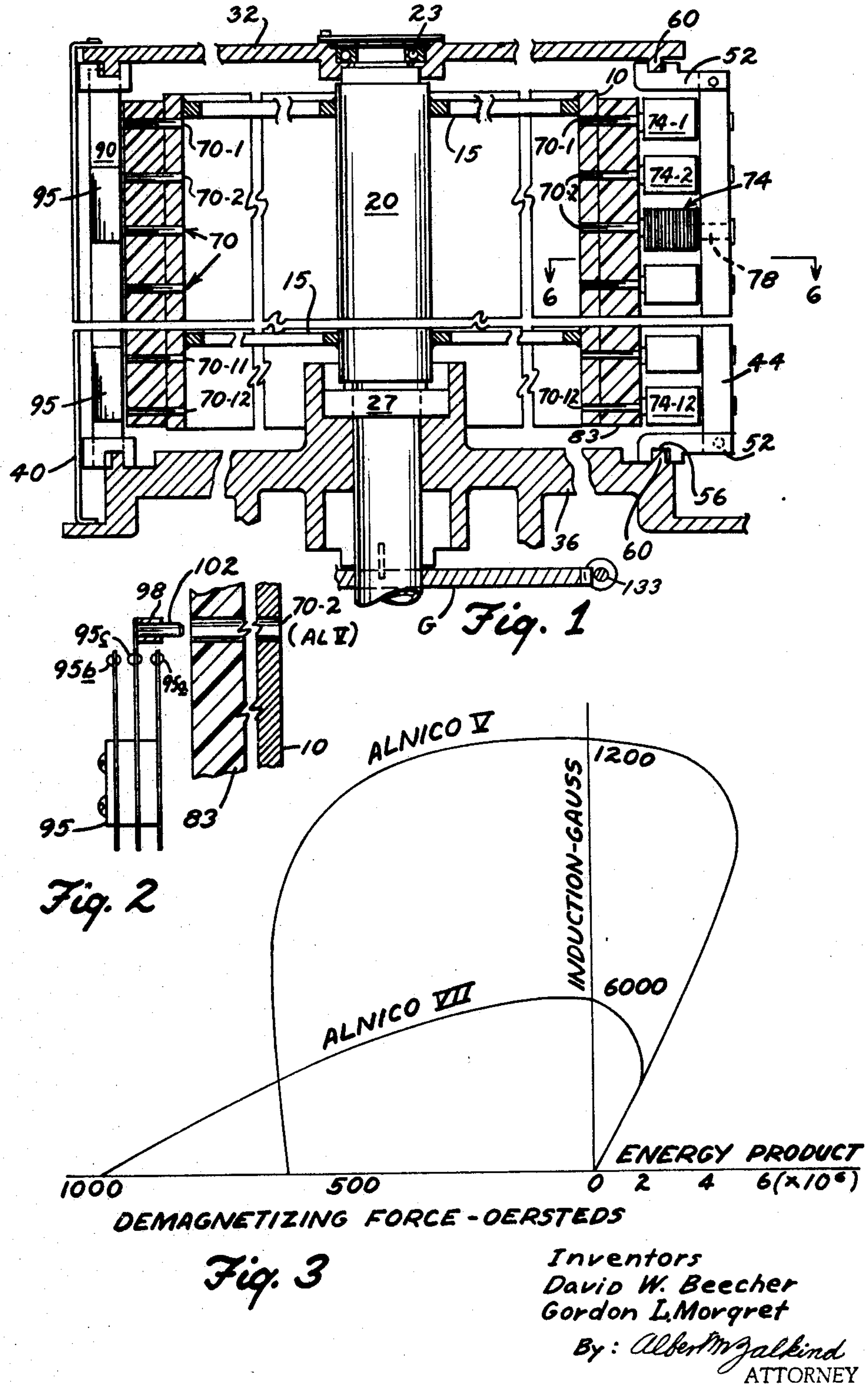
FIG. 1 is a cross sectional elevation of the major component of the invention showing a rotary drum, the write-in solenoids and magnetic switches.
FIG. 2 is an illustration to an enlarged scale of the open side of one of the code switches juxtaposed relative to a sectional portion of the drum shown.
FIG. 3 is a B–H curve showing characteristics of Alnico V and Alnico VII magnets.
Figure 6:
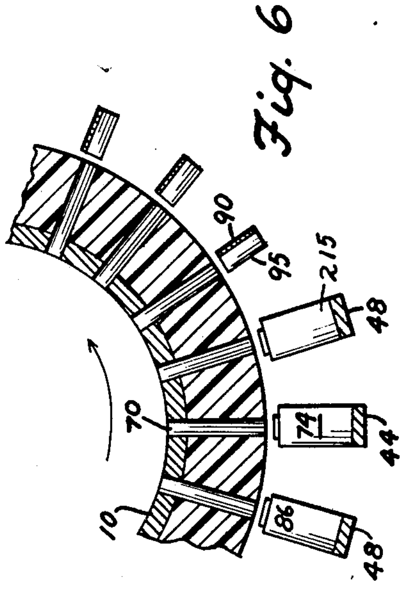
FIG. 6 is a fragmentary plan view through 6—6 of FIG. 1.

Referring now to the drawing, and in particular FIGS. 1, 2 and 6, a drum or cylinder 10 is shown carried by spaced plates 15 in turn carried by a vertical rotary shaft 20. Suitable bearings, such as 23 and 27, are provided for supporting the shaft in an upper plate 32 and a lower plate 36, respectively. These components are made of flux carrying ferrous material, such as iron or steel. The plates are secured in spaced parallelism by means of braces, such as 40, extending around the peripheries thereof, and it will be understood that three or four or more of such braces may be utilized, although only one is shown. Intermediate the plates 32 and 36 is a pair of stationary vertical ferrous bars 44 and 38, which bars adjoin each other, as seen in FIG. 6, and are connected to ferrous radial supports 52 at top and bottom; which supports are slotted as at 56 in order to grip respective ridges 60, which are integral with the plates 32 and 36. The drum 10 carries a plurality of columns of code magnets in the form of code pins, designated generally as 70, and specifically as 70–1, 70–2, etc., which are fixedly secured in bores in the drum. As will be apparent in the discussion to follow, any suitable number of columns of code pins may be used and any number of pins per column. The number of such columns determines the number of articles which may be coded and carried on the belt at one time and the number of pins actually used in the columns depends on the number of codes required, i.e., the number of stations or destinations which the belt is to serve. Thus, the drum has twelve pins per column, but only two or three may used per column for each code, there being a respective code for each station.

However, in order to provide capability for any column to be coded for any station, each column must have its full complement of code pins, e.g., twelve pins as signified in the present illustration. The pins 70 are made of Alnico V material having a relatively low coercive force.

The bars 44 carry a series of write-in solenoids or coils 74, which coils are supported on ferrous cores, such as 70, secured to bar 44.

From the foregoing description, it will be noted that if a coil 74 is energized, complete paths of magnetic flux are formed via respective core 78, bar 44, supports 52, and 56, plates 32 and 36, shaft 20, plates 15, drum 10, and any code pin 70 which is aligned with the particular solenoid energized.

For support of the portions of the pins which extend radially outward of drum 10, a heavy plastic cylinder 83 is secured to drum 10 in which plastic cylinder the pins are embedded, the ends of the pins 70 coming flush with the surface thereof, and in close proximity to the cores 78 on the stationary bar 44.

The construction and arrangement just described is also used for the bar 48 adjoining bar 44, as seen in FIG. 6. While the solenoids 74 are utilized for write-in, that is, magnetic polarization of code pins 70, the bar 48 carries an equal number of corresponding solenoids 86 identically positioned vertically as the solenoids 74, and upstream thereof, for purposes of erase of the code pins in the sense that polarization therein is reversed.

Angularly distributed around the drum are a series of stationary aluminum bars 90 which are suitably secured at upper and lower ends to the plates 32 and 36, respectively. The number of aluminum bars corresponds to the number of diverter stations of the article conveyor belt. Each such bar carries a plurality of code switches 95 in number dependent upon various factors, such as the number of codes required to be handled by the drum, whether or not any diverter station is a two-way station, that is, wherein articles may be diverted off either side of the belt by a two-way diverter, the vertical spacing of the pins 70 and the physical dimensions of the code switches themselves.

Each code switch 95 is of conventional construction, as seen in FIG. 2, being of a single pole double throw type comprising flexible leaves having contacts 95*a*, *b*, *c* wherein the middle leaf carries a plastic support cylinder 98 in which is cementedly gripped a small permanent magnet 102, comprised preferably of Alnico VII whereby the polarity of the magnet 102 is made as permanent as possible.

Contact 95*a* and contact 95*b* may be enegaged by the center contact 95*c* depending upon whether the switch magnet 102 is attracted or repelled by a code pin 70 on the same horizontal level, is determined by polarization of such pin effected by any respective solenoid 74 or 86.

Due to the fact that the outer ends of pins 70 are spaced from drum 10 so as to be close to magnets 102, any force of attraction of the drum on the switch magnets is of no moment and cannot cause accidental motivation, the plastic cylinder 83 rendering pin support across the spacing.

For one-way diverters attraction force between the code pins and switch magnets is utilized, causing engagement of contacts 93*a* and 95*c*. For a two-way diverter, repulsion force is also utilized to cause engagement between 95*b* and 95*c* to effect reversing the diverter actuating motor, as later explained. However, an important effect of the rear leaf which holds contact 95*b* is the prevention of too high a degree of flexure of the center leaf when a magnet 102 has a repulsion force acting thereon, which is normally the case when code pins 70 are being polarized by the reverse flux erase solenoids 86. In a practical sort system, the switches 95 are thus used as single pole single throw switches for one-way diverters, with engagement between contacts 95*a* and 95*c* and as single pole double throw. In such case, the unused leaf of contact 95*b* acts for two-way diverters, with engagement between contacts 95*a* and 95*b* also being electrically effective as well as mechanically effective to prevent excessive bending backwards of the center leaves of the switches.

A further important feature of the arrangement resides in mounting the magnets 102 in flux isolation by means of the aluminum bars 90 so that there is no complete flux path through magnets 102 as the code pins 70 sweep therepast. This helps preserve the permanency of polarity of the magnets 102 and prevents reversal of such polarity.

Referring to FIG. 3, the energy product versus induction curves are shown for Alnico V and Alnico VII, and it will be noted that Alnico V may be very readily magnetized and demagnetized as compared with Alnico VII.

From the foregoing description, it will be apparent that any of the switches 95 may be attracted or repelled by the magnetization coding of horizontally aligned code pins 70 as it rotates with drum 10. The switches 95 on any bar 90 are connected in series, as will be noted on the schematic diagram of FIG. 8, which is illustrative of circuitry used in conjunction with the memory unit and the diverter motor control starters for single operator control.

THE CAM SWITCHES

Various cam operated switches are used in series with the code switches, in order to insure current being conducted therethrough at the time of greatest pressure between the contacts. Thus, referring to FIGS. 4 and 5, a series of cam operated switches 105, 106 and 107 are shown mounted on a shaft 112 which will be understood to be secured between the end walls 116 and 120 of a frame having a top wall 122 and a bottom wall 124. The switches are operated by respective cams, such as 128, which cams are mounted on and rotate with a shaft 133 having an end 136 which extends outside the frame, and which is worm gear coupled for rotation with the shaft 20 of drum 10 (FIG. 1), and at the proper speed (72:1 ratio for a 72 column drum) so that these cam switches will close a number of times per drum rotation that there are columns of code pins in the drum, this being about each second for the cams for about ¾ r.p.m. for the drum, depending on the desired belt speed.

Figure 8:
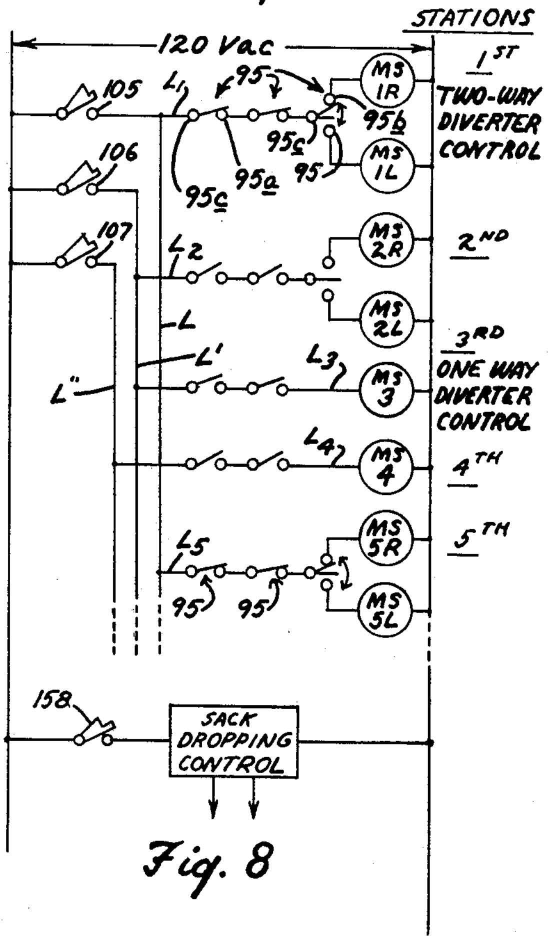
FIG. 8 is a schematic diagram showing control of the diverter motor starters by means of the magnetic switches.

These particular cam switches are in series with respective code switches 95, as noted in FIG. 8, and serve to close the circuit to respective diverter motor starters such as MS–IR (right), MS–IL (left), etc., for a two-way diverter at the first station at a time when the code switches have highest pressure contact between 95*b* and *c* or 95*b* and *a*, as effected by the timing of shafts 136 and 20.

It will be noted that the second and fifth stations are also equipped with two-way diverters having starters MS–2R, MS–2L and MS–5R, MS–5L, respectively, while the third and fourth stations have one-way diverters having motor starters MS–3, MS–4. Normally, the contacts 95*c* and 95*b* are intermittently closed by repulsion effect of pins 70 as drum 10 rotates, except when any respective pin is reversely polarized by a write-in coil 74. Thus, MS–IR, MS–2R, MS–5R, etc., is actuated in all cases except when the operator pushes a key for attraction of any switch 95 center leaf, for actuating specific one-way starters, or left side starters for the two-way diverters.

The cam switches 105, 106, and 107 are closed only when the respective sets of magnetic switches 95 are radially aligned with code pins so that the contacts of the latter switches carry current when acted on by the strongest radial flux and, thus, have the greatest mechanical pressure.

In series with the write-in solenoids 74 is cam switch 108 to predetermine the exact point at which these solenoids are energized. This cam switch prevents too long a current going through the coils 74 which might cause heating damage to them and also relieves the operator of the need for timing his keying with the rotation of drum 10.

Various other cam switches in addition to switch 108 are likewise supported within the frame on a shaft 140 mounted between support wall 142 and wall 120. These switches are actuated by respective cams 144 carried on a shaft 147 which is geared to shaft 133 with a ratio that will be understood at this time to be 1:1, that is the gear 150 on shaft 147 is equal to the gear 155 on shaft 133 for a single operator controlled system under discussion. However, as will be subsequently explained, shaft 147 is geared down for multiple operator control. The several cam switches actuated by the cam 144 perform various functions. For example, the cam switch 158 may be used to operate the bag drop of a hopper disposed above the article conveyor belt, such bag drop and hopper not being shown in the present application, although a construction of same is disclosed in the patent application of John V. Atanasoff, Ser. No. 98,101, filed Mar 24, 1961 and assigned to the assignee of the present application. The normally closed cam switch 162 is used for resetting the storage relays CR–1, etc., in FIG. 7. Another cam switch is utilized (FIG. 7) in series with the erase solenoids 86 to determine the time of energization thereof. Actually, but for the heating effect, the erase solenoids could be continuously energized.

THE ELECTRICAL CONTROL SYSTEM FOR SINGLE OPERATOR CONTROL

Figure 7:
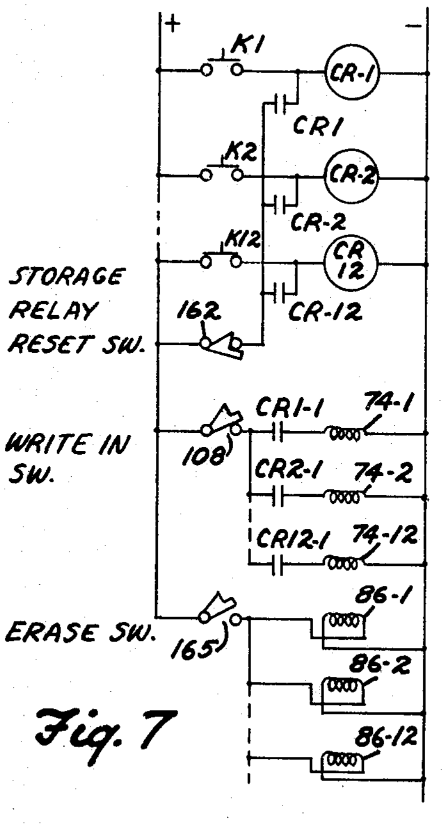
FIG. 7 is a schematic diagram showing basic circuitry for a series of write-in coils controlled by a keyboard in a single operator system.

Referring to FIG. 7, a simplified basic wiring diagram for keyboard control is shown wherein push-buttons or keys, such as K–1, K–2, K–12, control energization of respective write-in coils 74–1, 74–2, 74–12 through respective storage relays CR–1, CR–2 . . . CR–12 which have respective locking or sealing contacts CR1, CR2 . . . CR12 in series with cam switch 162 (also see FIG. 4) which is a storage relay reset switch.

Any suitable standard keyboard may be used, for example, a commercially obtainable board such as that manufactured by Carlton Controls Corporation of Worcester, Mass., models No. 3030.

When a particular selection or code of keys is pressed to set up, i.e., store the code in the relays for a particular station at which an article is to be diverted, the respective write-in coils 74 are energized through respective relay contacts CR1–1, CR2–1, etc., in series therewith upon closure of cam switch 108 which is timed to pass current for a short period as each column of code pins 70 sweep past the coils 74. Such pressing of selected keys for any station polarizes the respective code pins 70 in a direction opposite to that in which they had been polarized when passing the erase solenoids 86–1, 86–2 . . . 86–12, just upstream of solenoids 74. All erase solenoids are simultaneously energized via cam switch 165 as each vertical column of code pins sweeps past. Thus, the code for any particular station may require polarization of the third and seventh pins; for another station, the second and eleventh pins (see FIG. 1 showing these pins adjacent the magnet ends of the switches at the left), etc. Such coding is done by the operator as he places an article on the belt, as previously explained. Each cam switch 105, 106 and 107 is in series (FIG. 8) with a set of switches 95 on a respective bar 90 (FIG. 1). Thus, switch 105 is in series via the feeder line L with switches 95 connected by lead $L_1$, two of which switches are connected SPST and the last of which is connected SPDT, for control of a two-way diverter having motor starters MS–IR (article diverted off right side of belt) and MS–IL (off left). As mentioned above, although all switches 95 are physically identical and are actually SPDT type, the contact **95*b* (FIG. 2) is used electrically only for two-way diverters. Hence, the wiring diagram of FIG. 8 does not show contacts 95*b* for the first two switches in lead $L_1$, although they are actually present on the rear spring leaves of all switches to mechanically buffer the center leaves of the switches against forceful repulsion when any code pins 70 and any magnets 102** have like poles facing each other as the drum rotates.

It will be noted that the last switch in lead $L_1$ must make connection by attraction for contact **95*a* and by repulsion for contact 95*b*, in order to control respective motor starters MS–5R and MS–5L. Assuming that the exposed end of magnets 102 are south, it will be apparent that north polarization of code pins 70 by solenoids 74 will effect attraction. For repulsion, where required, the code pins are simply left in the "erased" state as they leave erase solenoids 86. In other words, the erased condition leaves code pins with south poles facing magnets 102. Accordingly, when coding for a left side delivery, say for motor starter MS–IL, the code pin therefor maintains its erased polarity, the respective solenoid 74–1 not being energized for reversal of polarity. Such solenoid would be energized, however, if starter MS–IR (right side delivery) were to control diverter direction. Thus, the energization of any solenoid 74 which codes the last switch of any set for two-way diverters depends on whether the article is to go into a chute on the right or the left side of the belt; such solenoids being energized for removal on the right side but not being energized for the left side, as will be noted from the position of rear contact 95*b* in FIG. 2 which requires repulsion force on magnet 102 to cause contact 95*c*** to engage it.

Switches in leads $L_2$ and $L_3$ illustrate closure of both sets (cam switch 108 is closed, both sets being in series with cam switch 106 (about to close)).

Articles are placed on the belt at particular spaced points therealong, with reasonable accuracy, and where there are more article placing points on the belt than there are diverting stations, the cam switches 105, etc. are in series with more than one set of switches 95 so as to be effective for one or more diverting stations. It will be noted that cam switch 105 is in series with two sets of switches 95 via $L_1$ and $L_5$, while 107 is shown in series via $L_4$ with but one set in the diagram, but it will be understood to be in series with additional magnetic switch sets, down feeder lines L, L′, L″, which showing is omitted as unnecessary to the disclosure, being a mere carrying forward of the principles disclosed.

In an actual operational model, of which the basic features are described in this specification, the cam switches are each in series with no less than six sets of magnetic switches, some eighteen diverters beng controlled thereby.

The number of cam switches 105, 106, 107, etc. required depends upon the number of articles the belt is designed to hold at one time and, more particularly, the spacing between articles as compared with the spacing between diverting stations. Thus, if the center to center spacing of articles on the belt is just equal to center to center spacing of diverting stations, then only one cam switch is necessary for the entire belt, such switch opening and closing each time the magnets 102 are radially aligned with code pins, i.e., closures of a single cam switch for the entire system per drum rotation, would be equal to the number of code pin columns in the drum. Thus, as an example, if there are 72 code pin columns corresponding to 72 package deposit points on the belt, and 72 diverting stations, the points and the stations are equally spaced, then only the switch 105 need be used and for each rotation of the drum it would close 72 times (in practice, approximately every second to a second and a half). However, as a practical matter, since the diverters are swinging paddles which may be three feet in the direction of the belt and the side chutes even wider, it is obvious that much space would be wasted on the belt by providing the same center to center spacing for articles as is required for installation of diverters and side chutes. In fact, the spacing between stations can be expected not only to be larger than the article spacing on the belt, but would frequently not be the same between stations, since some side chutes, e.g., for large cities, would receive more articles than others and, therefore, be larger. Accordingly, the article spacing is generally less than the station spacing. For example, the station spacing may be five feet and the article spacing four feet. In such case, when there is an article in position to be diverted at the first station, there may also be articles at stations #5, 9, 13 and 17, etc. Accordingly, one diverter cam switch operating each time the belt moves four feet will permit simultaneous current flow in the magnetic switch sets which are in series with that cam switch and, thus, all articles at such stations may be simultaneously pushed into respective side chutes. Assuming that the belt has moved another foot after such discharge, there will be articles at stations #2, 6, 10, 14, etc. Accordingly, an additional cam switch, properly phased with respect to the first cam switch mentioned, is needed to close at this time. Likewise, after the belt has moved two feet, there will be articles at stations #3, 7, 11, 15, etc.; after three feet of movement, there will be articles at stations #4, 8, 12, 16, etc., and after four feet, articles will again be at stations #5, 9, 13, 17, etc. Accordingly, four cam switches are required for such a system closing successively with each foot of travel of the belt and each cam switch closing each time the belt moves a respective four feet. Obviously, the number of cam switches required and the phasing of the cam switches depends upon the particular installation, in accordance with the abovementioned conditions of use required.

Referring to FIGS. 1 and 8, the code pins 70–1 and 70–11 might be considered as controlling the two switches 95 in $L_4$; the code pins 70–1, 70–11, 70–12, of any column or columns of pins might control the switches in $L_1$, etc. Thus, the coding of any column of pins, i.e., the particular pins in each column that are polarized to attract or repel magnets 102 of the code switches 70, depends on the physical location of the switch sets on bars 90 which depends on practical space limitations, as discussed below.

THE CODING SYSTEM

The angular spacing of the switch holding bars 90 corresponds to the spacing of diverters and the angular spacing of the code pin 70 columns corresponds to article placing points on the belt. The number of codes which can be placed on the drum at any one time depends on the number of columns. Assuming that a drum has 72 columns of code pins, with 12 pins per column, the number of columns that can actually be used at any one time and, accordingly, the number of articles for which coding can be effected as they are placed on the belt is reduced to about 68 for the reason that some spaces are taken up by the write-in and erase solenoids, as will be understood from FIG. 6. Further, if two pins per code are used in each column, then the machine could theoretically control 12×11/2 or 66 stations. Where all stations have two-way diverters, a two-pin code requiring two switches (used SPST) is used with a third switch (used SPDT). Thus, three switches 95 are used in each switch set for a two-pin code where the third switch governs left and right diverting at any station.

If all such diverters are two-way, some 110 actual destinations are theoretically possible, although this total would be somewhat reduced for practical reasons. Similarly, where three pins per code are used, then some 220 theoretical destinations can be served.

MULTIPLE OPERATOR PROGRAMMING

The circuitry of FIGS. 7 and 8 represent, as hereinabove mentioned, the basic circuitry for a simple system wherein a single operator programs the memory unit, and is for purposes of illustration of the fundamental principles of the overall system of the invention. In an actual installation, the arrangement would be such that several operators would program the same memory unit, such operators being stationed at various points of parcel or bag induction along a conveyor belt which may be several hundred feet in length. Thus, at each induction station would be an operator, a keyboard, and a package hopper or sack dropper directly over the belt. Each such hopper would hold a single parcel or bag, loaded therein by the operator who would then press a coding of several keys for destination diverter control. Assuming 5 ft. center spacing between sack droppers, as cam 158 (FIG. 4) rotates, the hoppers simultaneously drop their parcels on the belt. There is thus uniform spacing of articles on the belt, although the diverter stations, as hereinabove mentioned, would ordinarily not be of uniform spacing. In order to properly time the operation of the hoppers whereby they would drop their individual bag or package at the proper time, the cam operating speed ratio of shafts 133 and 147 provided by gears 150 and 155 is equal to the number of operators, i.e. induction stations. Such cam switch arrangement thus makes possible the proper phasing of operator programming in the memory unit whereby several operators may simultaneously program. Further, assuming a system is to handle the programming of a vertical column of code pins each second via the set of solenoids 74, a secondary code signal storage is provided for each operator, and such stored code or program must be transferred at a particular time to the diverter motor starters in a phase relationship.

Thus, in a basic system using but one operator, the ratio of gears 150 to 155 would be 1:1, all cams would turn at the same r.p.m., approximately once a second, which would vary as belt speed varied. It is understood that suitable conventional synchronization between the belt and drum 10, hence cam shaft 133, via worm gearing G connected to drum shaft 20 is provided. However, where more than one operator is used, it is obvious that the coding of columns of code pins 70, if a single drum be used for all operators, be timed so that the keyboard selection of each operator in turn is transferred to the memory unit.

Figure 4:
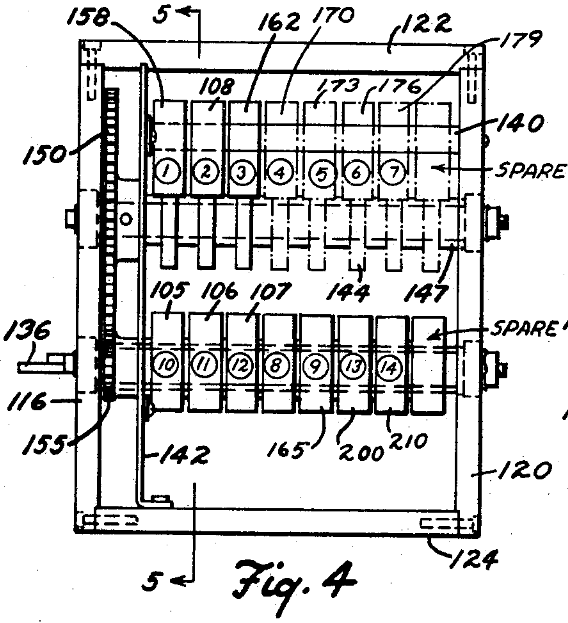
FIG. 4 is a showing of a plurality of cam switches carried on shafts supported in a frame of a typical unit wherein each cam switch may control several diverters.
Figure 5:
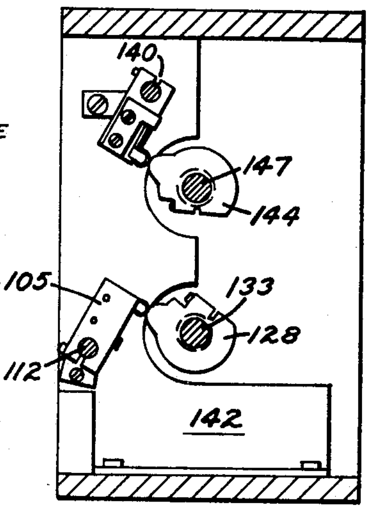
FIG. 5 is a section through 5—5 of FIG. 4.
Figure 9:
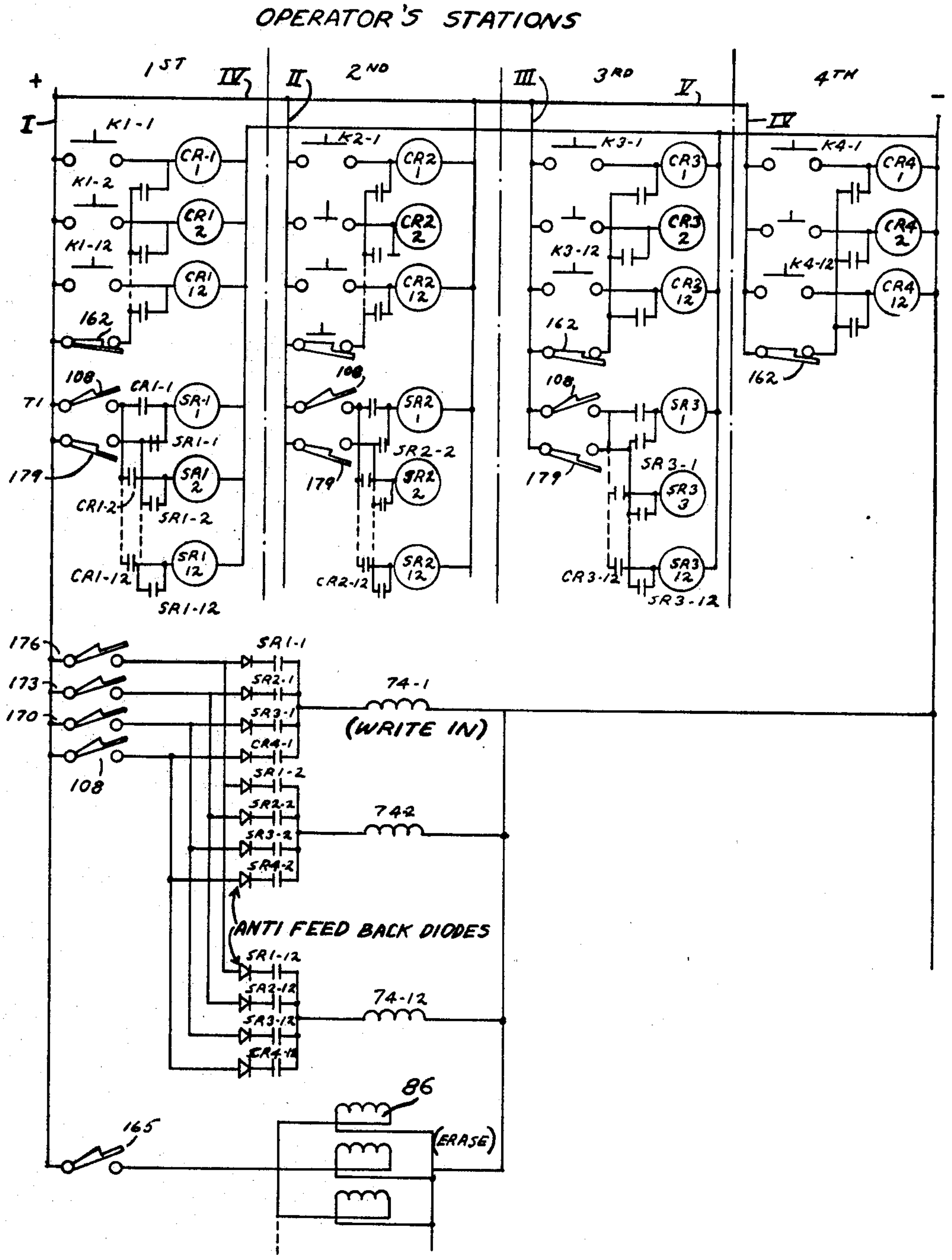
FIG. 9 is a schematic diagram of basic circuitry for use in a multiple operator system.

Referring now to FIGS. 4 and 9, and particularly FIG. 9, four operator stations are shown, each having a keyboard identical wtih that shown in FIG. 7, the keys in this instance being designated K1–1, K1–2, etc.; K2–1, K2–2, etc.; K3–2, etc.; K4–1, K4–2, etc. The primary storage relays SR1–1, CR2–1, CR3–1, CR4–1, etc., and the several stations perform precisely as the relays CR–1, CR–2, etc., for the single operator station of FIG. 7, except the first three stations feed to secondary storage relays SR1–1, SR2–1, SR3–1, etc. The last operator station has no secondary storage relays and the reason for this is that it is the last downstream station, as noted on the phase diagram of FIG. 10. Thus, the programming for operator station #4 is always first on the drum since the parcel therefrom is always ahead of the others in the final downstream sack dropper.

Connection is made for operator #1, #2, and #3 stations via lines I, II, III, IV, to the respective secondary storage relays from respective primary storage relays through cam operated switch 108, on the low speed shaft 147 (FIG. 4), and this switch also serves as the write-in switch for operator #4. This can be a four pole switch. It will be noted that other cam switches are on the shaft 147, e.g. 158 for the simultaneous opening of the sack droppers; the normally closed switch 162, a four pole switch for reset of all primary storage relays for all operators and this includes CR4–1, CR4–2, for operator #4. Also, this shaft carries switch cams for switches 170, 173, 176 for write-in of operators #1, #2, and #3, and a normally closed switch 179, a three pole switch, for reset of the secondary storage relays; all these switches may be referred to as the low speed cam switches. Similarly, the high speed shaft 133 which rotates at 72 times the drum speed, assuming 72 code pin columns on the drum, carries cams for diverter cam switches 105, 106, 107, the erase cam switch 165 common to all operators, all as heretofore explained in conjunction with FIGS. 7 and 8, and two additional cam switches 200 and 210 which perform a special memory erase function relating to improper off-center parcel dropping, to be subsequently explained.

The cams for the write-in switches are phased 90° apart in a four operator system so that write-in for each operator's coding occurs once every four seconds, and the gear ratio of shafts 133 and 147 is 4:1. Thus for every complete write-in sweep of all four stations the sack droppers are energized once (via switch 158) and all storage relays are reset (via switches 162 for the primary storage and switches 179 for the secondary storage).

It will be apparent that the invention is susceptible for use in a system having any desired number of operator coding stations, due regard being had for using a gear ratio between shafts 133 and 147 equal to the number of such stations.

THE PHASE RELATIONSHIP OF THE SYSTEM COMPONENTS

Figure 10:
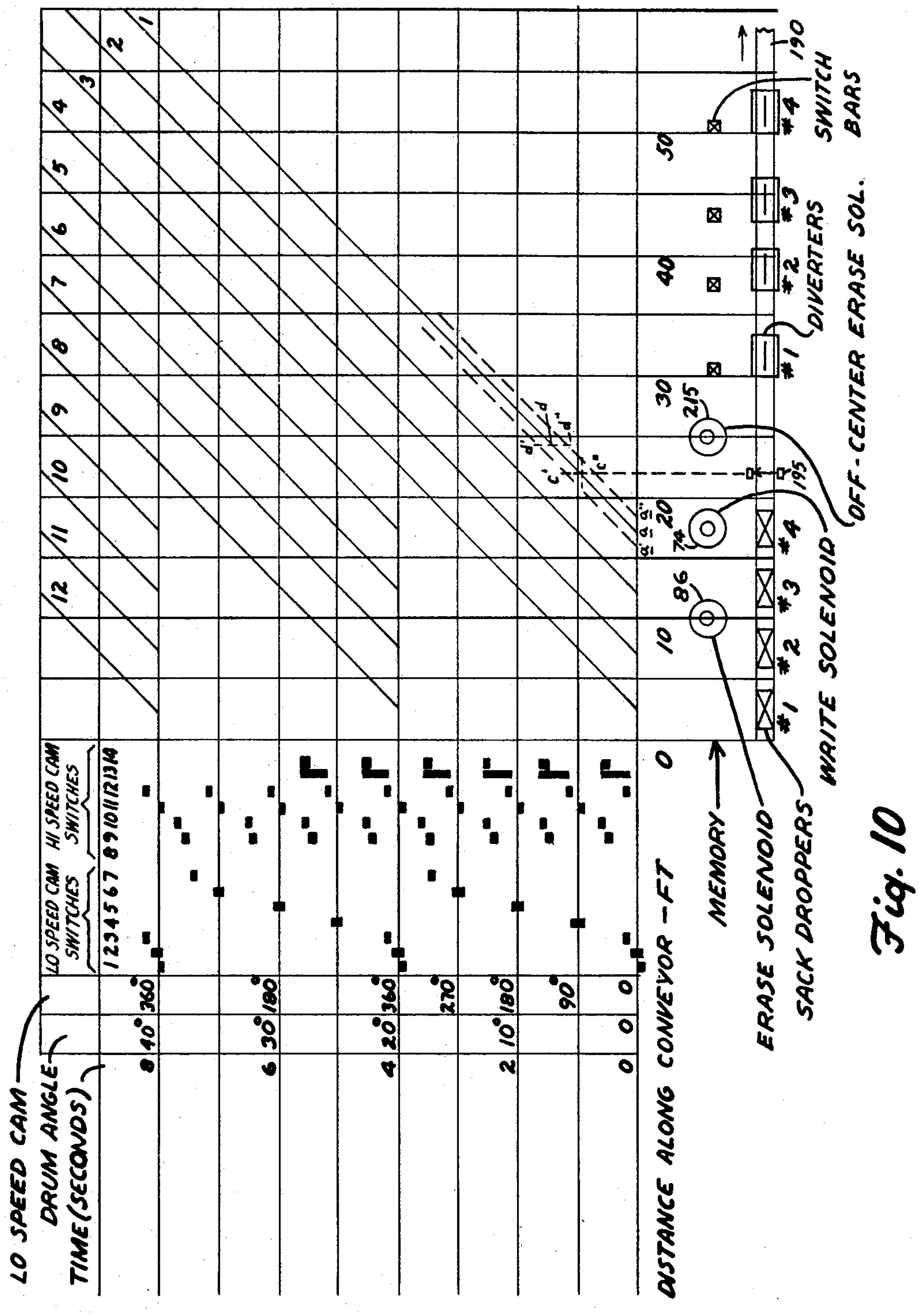
FIG. 10 is a phase diagram illustrating the positional relationship between the pins, the cam switches, the diverters, and the centers of article locations on the belt.

Referring now to FIG. 10, a graph is shown wherein the abscissa represents travel distance of packages on the belt 190, shown as moving in the direction of the arrow. In relationship to the upstream end of belt are the operators stations #1, #2, #3, and #4 and the sack droppers associated therewith. A photoelectric beam arrangement 195 is shown at a predetermined position beaming a light across the belt downstream from the sack droppers. A series of diverters designated as #1, #2, #3, and #4 are shown downstream of the photoelectric beam arrangement. Also, depicted along the abscissa are the analog positions of the solenoids such as the write solenoids 74, the erase solenoids 86, and another set of solenoids 215 for the purpose to be hereinafter described in connection with the off-center memory erase system for improperly placed packages. Further, along the abscissa will be noted the switch bars 90 (FIG. 1) which carry the code switch sets comprised of the series switch 95 (FIG. 8) disposed in analog relation to the belt.

The ordinate of the graph represents various related factors such as the time in seconds from 0 to 8, the angular rotation from the drum from 0 to 40°, and the angular rotation of the low speed cam shaft 147, it being noted that this shaft has gone through two complete 360° rotations in the time the drum has rotated 40°.

Shaft 147 rotates once each four seconds and shaft 133 at four times that rate driven by drum shaft 20.

The phase diagram of FIG. 10 represents the position relationships of the basic system components for a four operator station system as heretofore described in conjunction with the multiple operator circuitry of FIG. 9. It will be noted that a series of cam switches numbered from 1 through 7 and designated as the "low speed" are along the abscissa as is a series of "high speed" cam switches 8 through 14, in a separate group. Thus, the cam switches correspond to those heretofore described in conjunction with FIGS. 7, 8 and 9, as follows:

Low speed, actuated every four seconds (1) Sack drop cam switch 158.

(2) Write-in cam switch 108 for operator station #4, also serving as storage transfer switch from the primary storage relays to the secondary storage relays for operator stations #1, #2, and #3.

(3) Cam switch 162, the primary storage relay reset switch for all operator stations.

(4) Cam switch 170, the write-in switch for operator station #3.

(5) Cam switch 173, write-in switch for operator station #2.

(6) Cam switch 176, write-in switch for operator station #1.

(7) Cam switch 179, secondary storage relay reset cam switch for operator stations #1, #2, and #3.

High speed, actuated once each second (8) This is a spare cam switch intended for any other function desired to be subsequently added.

(9) Cam switch 165 for control of the erase coils 86.

(10) Cam switch 105 for diverter control at the first diverter station.

(11) Cam switch 106 for diverter control at the second diverter station.

(12) Cam switch 107 for diverter control at the third diverter station.

It will be noted from FIG. 8 that these diverter cam switches would control more than one diverter station depending upon any specific system.

(13) Cam switch 200 having a 135° dwell thereon used in the off-center erase system to be subsequently described.

(14) Cam switch 210 having a 5° dwell thereon also used in the off-center erase system.

Attention is called to the series of rectangular dots directly below the switches 1 through 14 on the diagram. The vertical height of these rectangular dots is approximately proportional to the length of time that the cam closes its respective switch for a normally open switch, or opens its respective switch for a normally closed switch. Thus, the relatively long bars underneath "13" represents 135° of cam travel closure of a switch 200 in the off-center erase system.

Referring to the slanted lines on the graph, it will be noted that there is a first group of lines designated with the numbers 1 through 4, a second group designated 5 through 8, and a third group designated 9 through 12. There are thus four lines in each of these groups and such four lines represents four simultaneously dropped parcels from the four sack droppers. Thus, at zero time the sack droppers have deposited their loads (lines 1–4) on the belt, spaced five feet apart between parcel centers as an ideal condition. The time-distance relationships of all parcels designated by the slanted lines are an analog of the code pin columns on drum 10, each parcel having its destination coded on a respective column. This illustrates the synchronization of movement of the sacks traveling on the belt with the angular rotation of the drum, the coding having been done at operator station #4. In a similar manner, the second batch of parcels designated by the lines 5 through 8 drop four seconds after the dropping of the first batch coded at operator station #3.

In a completely similar manner, the four sack drop of the last batch whose time-distance relationship is indicated by the slanted lines 9 through 12 occurs at the end of eight seconds after time zero, coded at operator station #2, etc.

Particular attention is given to the relative placement of the solenoids with respect to the slanted lines which represent the time-distance relationship of the pin columns on the drum. Initially, erasure is effected, or strictly speaking polarization of the pins in one direction by solenoids 86, followed by the coded write-in effected by solenoids 74, and finally erasure of all pins in any column for which the sack has not been properly placed on the belt, effected by solenoids 215, such erasure being a polarization in the same magnetic direction effected by solenoids 86. Such off-center erase system, as noted above, will be hereinafter explained. The diagram also shows the relationship of bars 90 as being downstream of the solenoids and, of course, this is required in order for the switches to be actuated by the code pins after coding thereof.

Thus, in a four operator system each operator can put a destination code on the drum each four seconds, the codings being stored in the secondary relay storage (except for operator at station #4) and each four seconds cam switch 158 closes to effect sack dropping. Operator station #4 has its coding written in at $t=0$ for the parcel in sack dropper #1 and each operator station coding is written in each second thereafter in each four second cycle.

OFF CENTER ERASE FEATURE

The invention contemplates the use of certain components for the purpose of erasing coding of pins under the circumstances where a sack or package may not be properly dropped on the belt in order to be in position to be engaged by a specific diverter at a destination intended.

Figure 11:
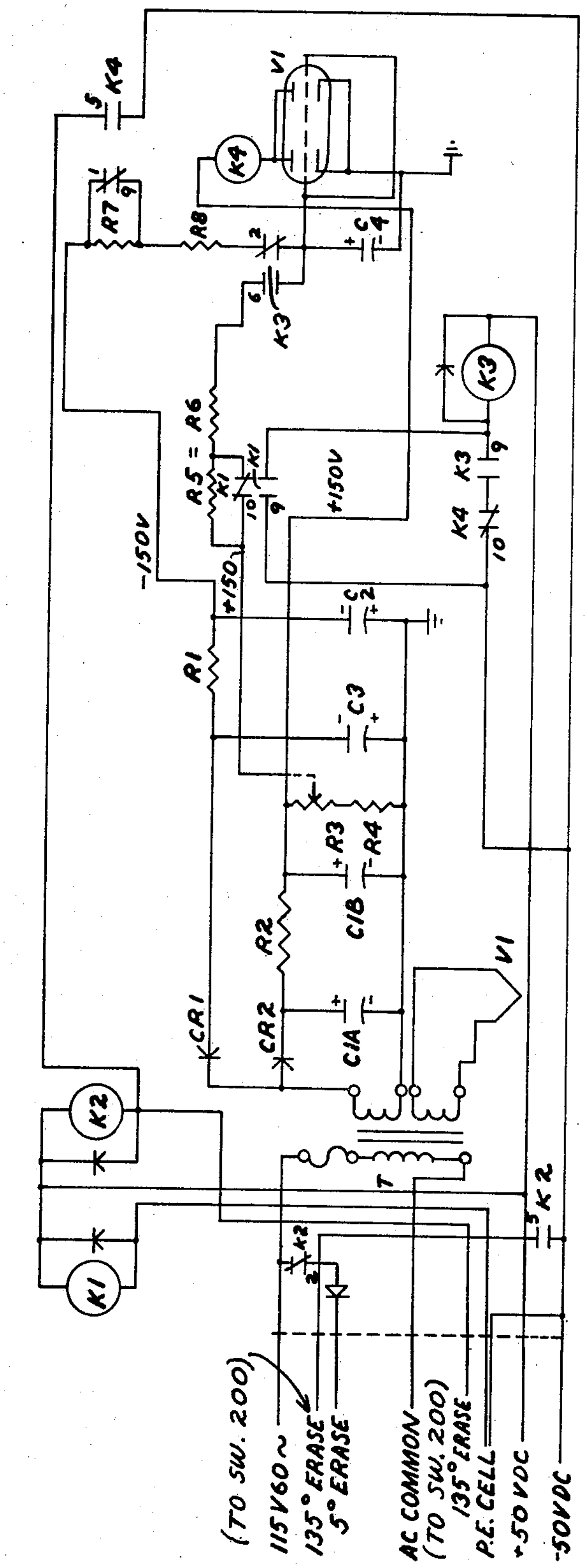
FIG. 11 shows the circuit of the off-center erase feature.

Referring now to FIGURE 11, a circuit is shown which provides for the charging of a condenser $C_4$, from the $-150$ $V_1$ DC line which is connected to the grid of tube $V_1$, maintained at $-150$ $V_1$ cut-off potential through resistance R8. The voltage of charge on C4 at the time a parcel has moved past the beam of photocell combination 190, shown on FIGURE 10, the phase diagram, is an analogue measure of the parcel length. The charging rate during this period is half the normal rate and the voltage of C4 is proportional to half the package length. The photocell combination comprises a light which is continuously on and which beams across the belt 195 in the direction of the arrow to a photocell in a conventional manner. At the time a package trips the light beam, a relay K1 is energized and locked in as long as light is blocked from the photoelectric cell, this being accomplished by conventional amplifier circuitry, not shown. This has the effect of opening the contact K–10, which is normally closed, and closing the K1 contact 9, which is normally open. Accordingly, a relay K3 is energized to close the normally open contact K3–9 to seal itself in an energized condition through a normally closed contact K4–10 of a relay K4. Energization of relay K3 closes a contact K3–6 and also simultaneously opens a normally closed contact K3–2 through which current has been feeding to condenser C4. Accordingly, the condenser C4 is now cut off from the $-150$ volt line and is connected to the $+150$ line through resistances R5 and R6 due to closure of contact K3–6 thus forming an RC circuit via these resistances, R5 and R6 being of equal value.

The condenser continues to be charged from the $+150$ volt line until the end of the package passes the photocell combination at which time the relay K1 is de-energized. This effects reclosing of contact K1–10 which shunts out R5 and thereby doubles the charging rate of capacitor $C_4$. The condenser $C_4$ thus continues to charge at double the rate from the $+150$ volt line until such time as the charge makes the grid of tube $V_1$ sufficiently positive to reach the cutoff voltage $V_1$ and the tube starts to conduct. This doubling of charge rate is readily effected by making R5 equal to R6 and practical values for the components described could be a capacity of .5 m.f.d. for $C_4$ and values for resistances R5 and R6 could be about one megohm each. Thus, the voltage on the grid is made more positive until the tube starts to conduct and thereby energizes the relay K4. This has the effect of momentarily closing the normally open contact K4–5 sending a pulse from 50 v. DC negative line to energize the relay K2 which in turn closes the normally open contact K2–5. Referring now to FIGURE 4, a cam switch arrangement 200 will be understood to be associated with the shaft 133, the high speed cam shaft, and it will be further understood that the cam on the shaft has a dwell of substantially 135 degrees. Thus the switch is maintained closed for a length of time corresponding to the maximum permissive error that the center of a package can be displaced from the proper locating point on the belt with which it is theoretically to coincide, e.g. about one foot, lagging or leading. Thus, referring to FIGURE 10 the solid slanted line designated at its lower extremity with a letter *a* indicates the relationships of time versus distance travel of a package when properly placed on the belt. The dashed line *a* indicates the maximum lag of the package center permitted with respect to the actual desired location center on the belt. The dashed line *a''* indicates the maximum lead permitted with respect to the center point. In actual practice, practical permissive distances between the actual and desired centers would be of the order of approximately one foot in a system designed to handle packages 4-feet long to be diverted by diverter paddles about 32'' long in the belt movement direction. If the switch 200 is closed it will seal in the relay K2 for the remainder of the 135 degrees closure of the cam switch 200 via closed contacts K4–5 and K2–5 which latter contact is in series with switch 200, and switch 200 along with contact K2–5, shunt contact K4–5. The closure of contact K4–5 is momentary as above stated for the reason that energization of relay K4 which opened NC contact K4–10, de-energizing the relay K–3 to open contact K3–6 and thus cutting off the +150 $V_1$ to the grid of $V_1$ while permitting closure of NC contact K3–2 to establish −150 $V_1$ to the grid thus cutting off tube conduction.

Along the line *a'* (FIG. 10) the distance from *c'* to *d'* corresponds to the timed interval between the arrival of a package center in alignment with the photocell and the time at which the relay K4 closes. The same explanation holds for the leading condition exemplified by the line *a''* insofar as the distance *c''* and *d''* is concerned. The relay K2 is now sealed in for the duration of the traverse of the cam 200. At this time the normally closed contact K2–10 is open and in fact has been open since the initial energization of relay K2.

The closure of contact K4–5 occurs when the cam switch 200 has been closed for about one-half of its total closure time, such total closure time being a traverse of a 135° cam dwell (not shown) against the actuating element or pin (not shown) of this switch. This instant coincides with the instant at which a properly placed parcel or sack on the belt has its center substantially on the line *a* of FIG. 10 and is in proper position to be moved off the belt by a diverter programmed for diverting such article at a specific selected station.

Figure 12:
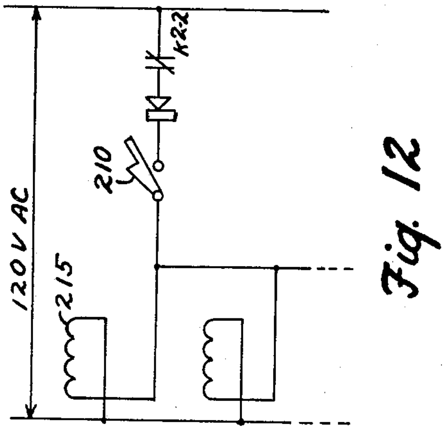
FIG. 12 is a schematic circuit detail for the off-center erase.

Thus, the pulse effected by the momentary energization of relay K4 results in energization of relay K2 and if the parcel center is in the correct position within the predetermined error of one foot lag or lead K2 remains energized. This is effected by a predetermined position of the photocell beam combination, which for the speeds and distances discussed herein is set at such point relative to the belt that a properly positioned package will travel two feet beyond the photocell beam just when the cam of cam switch 200 has reached its central position with respect to the switch actuator pin (not shown). If this condition obtains the NC contact K2–2 remains open and this contact is in series with the off-center erase solenoids 215 as shown in FIG. 12 via the series cam operated switch 210. The switch 210 is closed by its respective cam for a 5° dwell, this being the last 5° of rotation of the cam of switch 200. Accordingly, where a package is properly spaced the contact K2–2 remains open and the closure of switch 210 has no effect, i.e., no current passes to the off-center erase solenoids 215. However, if a parcel center is more than 1 foot from its proper belt location then switch 200 will not be closed at the time relay K4 is energized and therefore relay K2 remains de-energized and thus NC contact K2–2 remains closed and cam switch 210 effects energization of the erase solenoids 215. In other words, the relay K4 must be energized at a predetermined portion of traverse of cam switch 200 in order to prevent erasure. Thus, unless a closure of contact K4–5 occurs during the closure of cam switch 200 erasure of the code of a specific column of pins passing the solenoids 215 at that time will occur, regardless of whether there is a parcel corresponding to that column on the belt or not. Where there is a parcel for which the coding is thus erased, such parcel will merely travel to the end of the belt and be dumped.

The placement of the photocell is such as to be a 2-foot distance from the traveling center of a properly placed parcel which has just passed it at the time that cam switch 200 is at the center of its dwell, for parcels up to a maximum length of four feet. Thus, the system will determine the center of any package up to that length, since the circuitry of FIG. 11 is triggered first by the beam interruption and subsequently by beam resumption. Thus, on beam resumption K1 is de-energized through the amplifier (not shown) of the photocell combination in order to start the double rate charging of condenser $C_4$ once more.

The components T, CR–2, C1–A, C1–B, R2, R3, R4 constitute the DC power pack while the diode rectifiers across the relays K1, K2, K3 are suppression diodes to prevent excess sparking at the respective contacts.

What is claimed is:

1. In a system of the kind described, a magnetic memory unit comprising, a plurality of sets of magnetizable code pins, a plurality of sets of magnetically operable switches, said sets of pins and said sets of switches having means for effecting relative motion therebetween, means for magnetizing selected pins of selected code pin sets whereby relative motion of said code pin sets with respect to said magnetic switch sets is effective to actuate predetermined switches, said magnetizing means comprising a set of solenoids for effecting magnetization in one flux direction of said pins and an additional set of solenoids for magnetizing said pins in an opposite flux direction, said magnetic switches having permanent magnets having a single flux direction and said switches having means to effect contact by attraction or repulsion by magnetized code pins depending upon flux direction thereof.

2. In a system of the kind described, a magnetic memory unit comprising, a plurality of sets of magnetizable code pins, a plurality of sets of magnetically operable switches, said sets of pins and said sets of switches having means for effecting relative motion therebetween, means for magnetizing selected pins of selected code pin sets whereby relative motion of said code pin sets with respect to said magnetic switch sets is effective to actuate predetermined switches, including a drum member of magnetic material, said code pins being set in said drum, said magnetizing means comprising a plurality of solenoids disposed for magnetization of selected pins, said drum member being rotatively carried on a shaft member of magnetic material and being connected thereto by a support member of magnetic material, said solenoids being carried by a support member of magnetic material having a flux carrying connection member of magnetic material with said shaft member, whereby a magnetizing flux effects a complete linkage from said solenoids through selected pins via said members.

3. In a system of the kind described, a magnetic memory unit comprising a plurality of sets of magnetizable code pins and a plurality of sets of magnetic switches operable thereby, said sets of pins and said sets of switches having means for effecting relative motion therebetween wherein said sets of code pins are in position at predetermined times for operating said sets of switches, and an additional switch in series with at least one set of magnetic switches, and means for closing said additional switch at said predetermined times, said means for effecting said relative motion comprising a rotary drum, said code pins being carried thereby, and said means for closing said additional switch comprising a mechanical actuating element, and means for mechanically connecting said rotary drum with said element for effecting operation thereof to close said additional switch in synchronization with rotation of said drum.

4. In a device as set forth in claim 1, including means comprised of magnetic material supporting said pins and said solenoids, said support means being in flux transmitting connection whereby a complete flux linkage is effected through any pin being magnetized, and flux isolating support means for the permanent magnets of said magnetic switches to minimize the de-magnetizing effect on said permanent magnets by said code pins.

5. In a system of the kind described, a rotative drum having a plurality of sets of magnetizable pins arranged in longitudinal columns and radial planes, a bar radially spaced from said drum and parallel to the rotative axis thereof, a plurality of magnetizing solenoids on said bar disposed in a column and a planes corresponding to the radial planes of said pins, a plurality of stationary sets of magnetically operable switches distributed angularly about the major portion of said drum and being supported in sets in alignment with the columns of pins and having magnets disposed in radial planes corresponding to the radial planes of corresponding pins of said columns and having pole ends adjacent pole ends of said pins, being operable by magnetized pins, and means for selectively energizing said solenoids to code said pins by magnetization.

6. In a system of the kind described, a magnetic memory unit comprising a plurality of sets of magnetizable code pins, a plurality of sets of magnetically operable switches, said sets of pins and said sets of switches having means for effecting relative motion therebetween, whereby relative motion of said code pin sets with respect to said magnetic switch sets is effective to magnetically actuate predetermined switch sets when substantially aligned therewith, said means for effecting said relative motion comprising a continuously moving element, said code pins being carried thereby, a respective switch in series with said sets of magnetically operable switches, and each such respective switch having a cam to effect closure thereof, and means for synchronizing operation of said cams with said moving element whereby each such respective switch is closed at a predetermined time corresponding substantially to the time wherein the respective set of magnetically operable switches is aligned with a set of selected code pins for substantially maximum flux force therebetween.

7. In a system of the kind described, a magnetic memory unit comprising at least one set of magnetizable code pins, a plurality of sets of magnetic switches, each set being connected in series, said code pins and said sets of magnetic switches having means for effecting relative motion therebetween, whereby relative motion of magnetized code pin sets with respect to said magnetic switch sets is effective to actuate predetermined magnetic switch sets, including circuitry means for programming the magnetization of said code pins and comprising operator controlled coding keys and relays selectively energizable thereby, a set of solenoids for magnetizing respective code pins, and means for effecting relative motion between said code pins and said solenoids, respective contacts controlled by said relays effective to pass energizing current to selected solenoids, a switch means in series with said contacts operative to effect energization of said solenoids therethrough at a pre-determined point in the course of relative motion between said code pins and solenoids.

8. In a system as set forth in claim 7, including an additional set of solenoids disposed adjacent said first-mentioned set of solenoids wherein said first-mentioned set is operative to magnetize said code pins in one magnetic direction and said additional set is operative to magnetize said code pins in the opposite magnetic direction, the relative motion of said code pins with respect to said additional set of solenoids being the same as with respect to said first-mentioned set, and wherein said set of code pins is exposed for magnetization successively to said sets of solenoids, whereby pin in said code pin set may be selectively magnetized in one magnetic direction or the other.

9. In a system as set forth in claim 8, said magnetic switches being of a single pole double throw type and each such switch having a center contact leaf movable between a pair of spaced contact leaves and being alternately engageable therewith and being disengaged therefrom, a permanent magnet carried by each of said center leaves, wherein the magnetic polarization of said code pins effects attraction or repulsion of said center leaves via respective permanent magnets to effect contact engagement in a respective direction with one of said spaced leaves.

10. In a system as set forth in claim 7, including additional circuitry means comprising electric motor starters for controlling electric motors of diverter units, said sets of magnetic switches being connected for control of said starters.

11. In a system of the kind described, a magnetic memory unit comprising a plurality of sets of magnetizable code pins, a plurality of sets of magnetic switches, said sets of pins and said sets of magnetic switches having means for effecting relative motion therebetween, means for magnetizing selected pins of selected code pin sets whereby relative motion of said code pin sets with respect to said magnetic switch sets is effective to magnetically actuate predetermined magnetic switches, including circuitry means for programming the magnetization of said code pins and comprising manually operable keys and relays selectively energizable thereby, a plurality of solenoids for magnetizing respective code pins in one magnetic direction, another plurality of solenoids for magnetizing respective code pins in the opposite magnetic direction, respective contacts controlled by said relays responsive to key selection and effective to pass energizing current to one set of solenoids, switch means operative in response to said relative motion between said sets of pins and said sets of magnetic switches and being in series with said contacts and thereby operative to effect energization of selected solenoids at a predetermined point in the course of said relative motion, said set of keys being thus operative to selectively energize respective solenoids of said set of solenoids, and means for simultaneously energizing all of the solenoids of the other plurality, whereby the code pins of any set are selectively magnetized in one magnetic direction or the other.

12. In a system as set forth in claim 11, additional switches in series with sets of magnetic switches, means for periodically closing said additional switches in timed relationship with respect to each other and with respect to the relative motion between said code pin sets and said magnetic switch sets, and circuitry means whereby said magnetic switch sets are operative to pass current only upon closure of a particular one of the additional switches, closure of said additional switches being timed to correspond to a condition of proximity between said sets of code pins and said sets of magnetic switches.

13. In a system as set forth in claim 12, said additional switches comprising two sets of switches, one set being timed to operate at a cycle rate faster than the other set and being the aforementioned switches in series with sets of magnetic switches, and means for providing for a plurality of operators to program said magnetic memory unit under timed control of said other set of slower cyclic rate switches, the speed ratio between said sets of switches being equal to the number of operators programming said memory unit.

14. In a system as set forth in claim 13, wherein said means for effecting relative motion between said code pins and said magnetic switches comprises a continuously movable support element for said code pins, each said set of switches having cam actuators mounted in sets on respective shafts and means interconnecting said shafts for interdependent motion to effect said speed ratio corresponding to said number of operators programming said memory unit, and means synchronizing the rotation of the higher speed cam switch shaft with the rate of relative motion between said sets of code pins and said sets of magnetic switches.

15. In a system of the kind described, a magnetic memory unit comprising at least one set of magnetizable code pins, a plurality of sets of magnetic switches, each set being connected in series, said code pins and said sets of magnetic switches having means for effecting relative motion therebetween, whereby relative motion of magnetized code pin sets with respect to said magnetic switch sets is effective to actuate predetermined magnetic switch sets, including circuitry means for programming the magnetization of said code pins and comprising operator controlled coding keys and relays selectively energizable thereby, a set of solenoids for magnetizing respective code pins, and means for effecting relative motion between said code pins and said solenoids, respective contacts controlled by said relays effective to pass energizing current to selected solenoids, a switch means in series with said contacts operative to effect energization of said solenoids therethrough at a predetermined point in the course of relative motion between said code pins and solenoids, including an additional set of solenoids disposed adjacent said first-mentioned set of solenoids wherein said first-mentioned set is operative to magnetize said code pins in one magnetic direction and said additional set is operative to magnetize said code pins in the opposite magnetic direction, the relative motion of said code pins with respect to said additional set of solenoids being the same as with respect to said first-mentioned set, and wherein said set of code pins is exposed for magnetization successively to said sets of solenoids, whereby pins in said code pin set may be selectively magnetized in one magnetic direction or the other, at least one of said magnetic switches having contacts alternately operative to effect current conducting engagement in proximity to respective code pins dependent on direction of magnetization of respective code pins, and additional circuitry means responsive to alternate operation of said switch for effecting a respective alternate control function.

16. In a device of the kind described, a memory unit having an array of permanently magnetizable pins carried in a movable mount of magnetic material; and electromagnet means supported in a mount of magnetic material and in proximity to magnetize any pin moving therepast when said electromagnet means is energized; a flux transmitting connection between said mounts whereby a flux circuit is effected between said electromagnet and any pin being magnetized thereby, said movable mount being a rotary drum and said pins being carried thereby in longitudinal rows and in radial planes, and said electromagnet means comprising an individual electromagnet for the pins in respective radial planes.

17. In a system of the kind described, a magnetic memory unit comprising a plurality of sets of magnetizable code pins, a plurality of sets of magnetically operable switches, each of said switches comprising a magnet, means for reversibly polarizing selected pins of selected sets to effect magnetic coding of each set of code pins, means for effecting relative motion between said code pin sets on the one hand and said switches and magnetizing means on the other hand, whereby direction of polarization of magnetized pins selectively attracts or repels the magnets of said switches to actuate said switches during the course of relative motion; each said latter switch comprising at least three spaced flexible leaves, said magnet being carried on an intermediate leaf, and said leaf being engageable with one of the other leaves by attraction of said magnet by a code pin and engageable with another of said leaves by repulsion of said magnet by another code pin, said code pins being in the same set; said magnetizing means comprising first and second sets of solenoids, each set being operative to effect polarization of said code pins in a respective direction, said sets of solenoids being arranged with respect to said set of code pins so that said code pins are subjected to the flux of said first set of solenoids and subsequently are subjected to the flux of said second set of solenoids, and code control means for energizing selected solenoids of said second set of solenoids, whereby all pins of any set of code pins are all polarized in the same direction by said first set of solenoids and subsequently at least one selected code pin is reversed in polarity by a selectively energized solenoid of said second set of solenoids.

18. In a system of the kind described, a magnetic memory unit comprising a plurality of reversibly magnetizable code pins, means for effecting simultaneous movement of said code pins, a plurality of magnetically operated switches, said switches having permanent magnets for actuation thereof, said code pins being alignable with said permanent magnets as code pins move with respect thereto, whereby said switches are actuated by attraction or repulsion between said permanent magnets and said code pins, said permanent magnets being of relatively high coercive material with respect to said code pins whereby said code pins effect a minimum depolarization of said permanent magnets; including support means comprised of magnetic material supporting said code pins, and magnetizing solenoid means, said solenoid means and said support means being in flux transmitting connection whereby a complete flux linkage is effected through any code pin being magnetized, and flux isolating support means for the permanent magnets of said magnetic switches to minimize the demagnetizing effect on said permanent magnets by said code pins.

References Cited

UNITED STATES PATENTS

| | | | |
|---|---|---|---|
| 2,533,326 | 12/1950 | Putt | 340—173 |
| 2,484,049 | 4/1939 | Putt | 340—173 |

TERRELL W. FEARS Primary Examiner

U.S. Cl. X.R.

226—74; 209—213